United States Patent
Piecko (10) Patent No.: US 9,747,312 B2
(45) Date of Patent: Aug. 29, 2017

(54) COMPUTER IMPLEMENTED METHOD FOR CREATING DATABASE STRUCTURES WITHOUT KNOWLEDGE ON FUNCTIONING OF RELATIONAL DATABASE SYSTEM

(71) Applicant: PILAB S.A., Wroclaw (PL)

(72) Inventor: Krystian Piecko, Wroclaw (PL)

(73) Assignee: PILAB S.A., Wroclaw (PL)

( * ) Notice: Subject to any disclaimer, the term of this patent is extended or adjusted under 35 U.S.C. 154(b) by 244 days.

(21) Appl. No.: 14/469,968

(22) Filed: Aug. 27, 2014

(65) Prior Publication Data

US 2015/0081747 A1 Mar. 19, 2015

(30) Foreign Application Priority Data

Aug. 30, 2013 (EP) ..................................... 13461546

(51) Int. Cl.
*G06F 17/30* (2006.01)

(52) U.S. Cl.
CPC .. *G06F 17/30312* (2013.01); *G06F 17/30932* (2013.01); *G06F 17/30563* (2013.01)

(58) Field of Classification Search
CPC ......... G06F 17/30604; G06F 17/30607; G06F 17/30312; G06F 17/30932; G06F 17/30563

See application file for complete search history.

(56) References Cited

U.S. PATENT DOCUMENTS

| | | | |
|---|---|---|---|
| 5,257,349 A | 10/1993 | Alexander | |
| 5,418,961 A | * 5/1995 | Segal | ................ G06F 17/30607 |
| 5,548,758 A | 8/1996 | Pirahesh et al. | |
| 5,604,899 A | 2/1997 | Doktor | |

(Continued)

FOREIGN PATENT DOCUMENTS

| EP | 2455869 A1 | 5/2012 |
|---|---|---|
| WO | WO-02059793 A3 | 4/2003 |

OTHER PUBLICATIONS

Office action dated Feb. 11, 2016 for U.S. Appl. No. 14/222,795.

(Continued)

*Primary Examiner* — Rehana Perveen
*Assistant Examiner* — Alp Onat
(74) *Attorney, Agent, or Firm* — Wilson Sonsini Goodrich & Rosati (57) ABSTRACT

Computer implemented methods for storing ad hoc relations between previously unrelated database objects assigned to different database structures using an electronic computing device are presented, the methods including: causing the electronic computing device to define at least three database structures: structure A, structure B and structure C, where each of the at least three database structures each includes a number of objects, where there exists at least one relation between objects of structure A and objects of structure B, and where there exists at least one relation between objects of structure B and objects of structure C; filtering data of structure A; accessing structure B using a first selected relation between structure A and structure B; storing information about filtering of structure A and information on a first selected path between structure A and structure B; filtering results obtained from structure B.

20 Claims, 8 Drawing Sheets

(56) References Cited

U.S. PATENT DOCUMENTS

| | | | |
|---|---|---|---|
| 6,038,566 | A | 3/2000 | Tsai |
| 6,105,035 | A | 8/2000 | Monge et al. |
| 6,163,775 | A | 12/2000 | Wlaschin et al. |
| 6,192,371 | B1 | 2/2001 | Schultz |
| 6,934,712 | B2* | 8/2005 | Kiernan ............ G06F 17/30595 |
| 6,947,945 | B1* | 9/2005 | Carey ............... G06F 17/30917 |
| 6,986,102 | B1 | 1/2006 | Baer et al. |
| 7,058,622 | B1 | 6/2006 | Tedesco |
| 7,363,593 | B1 | 4/2008 | Loyens et al. |
| 7,895,191 | B2* | 2/2011 | Colossi ............. G06F 17/30312 |
| | | | 707/600 |
| 8,103,703 | B1 | 1/2012 | Jetter et al. |
| 8,224,829 | B2 | 7/2012 | Pauly |
| 8,364,623 | B1 | 1/2013 | Bunker et al. |
| 8,386,920 | B2 | 2/2013 | Cox et al. |
| 8,793,246 | B1 | 7/2014 | Mathur et al. |
| 8,874,621 | B1* | 10/2014 | Goodwin ......... G06F 17/30569 |
| | | | 707/756 |
| 9,218,380 | B2 | 12/2015 | Adzic et al. |
| 9,483,508 | B1* | 11/2016 | Wilkes ............ G06F 17/30312 |
| 2001/0051948 | A1 | 12/2001 | Srinivasan et al. |
| 2002/0029209 | A1 | 3/2002 | Bernal et al. |
| 2003/0088545 | A1 | 5/2003 | Subramaniam et al. |
| 2003/0208493 | A1 | 11/2003 | Hall |
| 2003/0229640 | A1 | 12/2003 | Carlson et al. |
| 2004/0088283 | A1* | 5/2004 | Lissar ............... G06F 17/30604 |
| 2004/0133581 | A1 | 7/2004 | Shinjo |
| 2004/0139102 | A1 | 7/2004 | Vierich et al. |
| 2004/0255301 | A1* | 12/2004 | Turski ............. G06F 17/30607 |
| | | | 719/316 |
| 2005/0039033 | A1 | 2/2005 | Meyers et al. |
| 2005/0216503 | A1* | 9/2005 | Charlot ................. G06Q 50/22 |
| 2005/0228818 | A1* | 10/2005 | Murthy ............. G06F 17/2205 |
| 2006/0173841 | A1 | 8/2006 | Bill |
| 2006/0288035 | A1* | 12/2006 | Viavant ............ G06F 17/30595 |
| 2007/0112803 | A1* | 5/2007 | Pettovello ........ G06F 17/30094 |
| 2007/0198557 | A1* | 8/2007 | Ching .............. G06F 17/30607 |
| 2008/0033987 | A1 | 2/2008 | Carter |
| 2008/0183658 | A1* | 7/2008 | Mangipudi ....... G06F 17/30563 |
| 2008/0301181 | A1* | 12/2008 | Lori ................. G06F 17/30604 |
| 2009/0103715 | A1 | 4/2009 | Thorbjornsson |
| 2009/0222408 | A1 | 9/2009 | Charles et al. |
| 2010/0287212 | A1 | 11/2010 | Becker |
| 2010/0299348 | A1 | 11/2010 | Gill et al. |
| 2011/0231438 | A1 | 9/2011 | Pfeifle et al. |
| 2012/0096002 | A1 | 4/2012 | Sheehan |
| 2012/0117027 | A1 | 5/2012 | Shau et al. |
| 2012/0246147 | A1 | 9/2012 | Lamb et al. |
| 2012/0284635 | A1* | 11/2012 | Sitrick ................. G06Q 10/101 |
| | | | 715/751 |
| 2013/0083104 | A1 | 4/2013 | Mitsuki |
| 2013/0086104 | A1 | 4/2013 | Morrison et al. |
| 2013/0091180 | A1* | 4/2013 | Vicat-Blanc-Primet H04L 41/0816 |
| | | | 707/803 |
| 2013/0144917 | A1 | 6/2013 | Hosurmath et al. |
| 2013/0307843 | A1 | 11/2013 | Sikka et al. |
| 2013/0311518 | A1 | 11/2013 | Agbaria |
| 2014/0297693 | A1* | 10/2014 | Piecko ............ G06F 17/30292 |
| | | | 707/803 |
| 2015/0006507 | A1 | 1/2015 | Piecko et al. |
| 2015/0066986 | A1 | 3/2015 | Piecko et al. |

OTHER PUBLICATIONS

Office action dated Jun. 2, 2016 for U.S. Appl. No. 14/222,795.
European Patent Office Search Report; Re. Application No. 13461536.8-1951 Report Date: Sep. 10, 2013.
European Patent Office Search Report; Re. Application No. 13461545.9-1952 Report Date: Apr. 25, 2014.
European Patent Office Search Report; Re. Application No. 13461546.7-1952 Report Date: Apr. 11, 2014.
European Patent Office Search Report; Re. Application No. 13461516.0-1951 Report Date: Jul. 30, 2013.
Office action dated Aug. 22, 2016 for U.S. Appl. No. 14/315,481.
Office action dated Sep. 12, 2016 for U.S. Appl. No. 14/469,958.
Anonymous: II sql—Relational database design question—Surrogate-key or Natural-key?—Stack Overflow, Sep. 19, 2010 (Sep. 19, 2010), XP055109921, Retrieved from the Internet: URL: http://stackoverflow.com/questions/3747730/relational-database-design-question-surrogate-key-or-natural-key [retrieved on Mar. 25, 2014] "see answer from Mitch Dempsey".
Office Action dated Mar. 13, 2017 for U.S. Appl. No. 14/315,481.
Office Action dated Sep. 22, 2016 for U.S. Appl. No. 14/222,795.
Office Action dated Apr. 28, 2017 for U.S. Appl. No. 14/222,795.
Office Action dated May 26, 2017 for U.S. Appl. No. 14/469,958.
Office Action dated Jul. 3, 2017 for U.S. Appl. No. 14/315,481.

* cited by examiner

```
<path>
    <step>
        <setToFilter>A</setToFilter>
        <conditions>
            <condition> (...) </condition>
            (...)
            (...)
            (...)
        </conditions>
    </step>
    <stepRelation = 'Relation_A'>
        <step>
            <setToFilter>B</setToFilter>
            <conditions>
                <condition> (...) </condition>
                (...)
                (...)
                (...)
            </conditions>
        </step>
    </stepRelation>
    <stepRelation = 'Relation_C'>
        <step>
            <setToFilter>C</setToFilter>
            <conditions>
                <condition> (...) </condition>
                (...)
                (...)
                (...)
            </conditions>
        </step>
    </stepRelation>
</path>
```

COMPUTER IMPLEMENTED METHOD FOR CREATING DATABASE STRUCTURES WITHOUT KNOWLEDGE ON FUNCTIONING OF RELATIONAL DATABASE SYSTEM

FIELD OF INVENTION

The disclosure is related to computer implemented methods for storing ad hoc relations between previously unrelated database objects assigned to different database structures. The method finds its application in data retrieval and processing systems.

BACKGROUND

Relational databases may be defined (source: Wikipedia) as a database that has a collection of tables of data items, all of which are formally described and organized according to the relational model. The term—relational database—is in contrast to only one table as the database, and in contrast to other models which also have many tables in a single database.

In the relational model, each table schema should identify a primary column, called the primary key, used for identifying a row. Tables can relate by using a foreign key that usually points to the primary key of another table. The relational model offers various levels of refinement of the table relations called database normalization. (See Normalization below). The database management system (DBMS) of a relational database is called a relational database management system (RDBMS), and is the software of a relational database.

When creating a database, usually the designer uses separate tables for different types of entities, for example: users, employees, customers, orders, items etc. What is further needed are relationships between these tables. For instance, customers make orders, and orders contain items. These relationships need to be represented in the database.

There are several types of database relationships, such as: One-to-One Relationships, One-to-Many and Many-to-One Relationships, Many-to-Many Relationships, and Self Referencing Relationships.

These relationships have to be hardcoded by the database designer, which is quite limiting in large databases, where very high number of relations between data structures may exist. Each change in relationships defined in the database required deep interference with database schema and database processes. Therefore, it cannot be executed by a regular end user of a database system.

Modifications in complex database schemas are very demanding as they need a lot of tests, field trials, and experienced database engineers to design and implement.

Structured Query Language (SQL) provides for creation of Views. A View may be compared to a virtual table, through which a section of data from one or more tables may be viewed. Views however, do not contain data of their own. A View is stored as a SELECT statement in the database. A View contains rows and columns, just like a real table. The fields in a View are fields from one or more real tables in the database.

Therefore, in order to create ad-hoc relationships between objects of different tables, one may create a View and store such view in order to make it available for any other user of the database system.

Views create the appearance of a table, but the DBMS must still translate queries against the view into queries against the underlying source tables. If the view is defined by a complex, multi-table database query then simple queries on the views may take considerable time. This results in significant performance decrease.

Additionally, views are new database objects, which means they occupy space and operational memory.

RDBMS often provides a capability of stored procedures. Stored procedures allow coupling set-based power of SQL with iterative and conditional processing control of code development.

Drawbacks of stored procedures include limited portability (especially when moving from one database type to another—sometimes even between different versions of the same database), any data errors in handling stored procedures are not generated until runtime. Additionally, too much overhead is incurred from maintaining Stored Procedures that are not complex enough. As a result, simple SELECT statements should not be executed as stored procedures.

With SQL, there is a possibility to copy information from one table into another. The SELECT INTO statement copies data from one table and inserts it into a new table. This creates a new physical table (PT) that represents data of other tables at the moment of creation of the new table (PT). If after executing SELECT INTO there are created new relations, the new table (PT) will not reflect it.

As such, there is a need to design and implement an efficient storing of ad hoc relations between previously unrelated database objects assigned to different database structures

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. This Summary presents embodiments of the invention in a simplified form as a prelude to the more detailed description that is presented below.

As such, computer implemented methods for storing ad hoc relations between previously unrelated database objects assigned to different database structures using an electronic computing device are presented, the methods including: causing the electronic computing device to define at least three database structures: structure A, structure B and structure C, where each of the at least three database structures each includes a number of objects, where there exists at least one relation between objects of structure A and objects of structure B, and where there exists at least one relation between objects of structure B and objects of structure C; filtering data of structure A; accessing structure B using a first selected relation between structure A and structure B; storing information about filtering of structure A and information on a first selected path between structure A and structure B; filtering results obtained from structure B; accessing structure C using a second selected relation between structure B and structure C; and storing information about filtering of structure B and information on a second selected path between structure B and structure C.

In some embodiments, the information stored is kept in a form of an XML file. In some embodiments, the XML file includes information related to selected structures, selected relations and selected filters. In some embodiments, the steps of filtering, accessing and storing are executed with respect to a further structure D related to the structure C.

In some embodiments, the database includes: a first data structure, stored in a memory, including a definition of at least one data set where each data set includes a data set identifier and logically holds data objects of a same type; a second data structure, stored in the memory, including definitions of properties of objects where each property includes an identifier of the property and an identifier of a set, from the first data structure, the property is assigned to; a third data structure, stored in the memory, including definitions of objects where each object includes an identifier and an identifier of a set, from the first data structure, the object is assigned to; a fourth data structure, stored in the memory, including definitions of properties of each object where each property of an object associates a value with an object, from the third data structure, and a property of the set, from the second data structure, the object is assigned to; a fifth data structure, stored in the memory, including definitions of relations where each relation includes an identifier of the relation; and a sixth data structure, stored in the memory, for storing definitions of relations between objects where each objects relation associates a relation, from the fifth data structure, to two objects from the third data structure.

In other embodiments, computing device program products for storing ad hoc relations between previously unrelated database objects assigned to different database structures using an electronic computing device are presented, the computing device program products including: a non-transitory computer readable medium; first programmatic instructions for causing the electronic computing device to define at least three database structures: structure A, structure B and structure C, where each of the at least three database structures each includes a number of objects, where there exists at least one relation between objects of structure A and objects of structure B, and where there exists at least one relation between objects of structure B and objects of structure C; second programmatic instructions for filtering data of structure A; third programmatic instructions for accessing structure B using a first selected relation between structure A and structure B; fourth programmatic instructions for storing information about filtering of structure A and information on a first selected path between structure A and structure B; fifth programmatic instructions for filtering results obtained from structure B; sixth programmatic instructions for accessing structure C using a second selected relation between structure B and structure C; seventh programmatic instructions for storing information about filtering of structure B and information on a second selected path between structure B and structure C.

In some embodiments, the information stored is kept in a form of an XML file. In some embodiments, the XML file includes information related to selected structures, selected relations and selected filters. In some embodiments, the steps of filtering, accessing and storing are executed with respect to a further structure D related to the structure C.

In some embodiments, the database includes: a first data structure, stored in a memory, including a definition of at least one data set where each data set includes a data set identifier and logically holds data objects of a same type; a second data structure, stored in the memory, including definitions of properties of objects where each property includes an identifier of the property and an identifier of a set, from the first data structure, the property is assigned to; a third data structure, stored in the memory, including definitions of objects where each object includes an identifier and an identifier of a set, from the first data structure, the object is assigned to; a fourth data structure, stored in the memory, including definitions of properties of each object where each property of an object associates a value with an object, from the third data structure, and a property of the set, from the second data structure, the object is assigned to; a fifth data structure, stored in the memory, including definitions of relations where each relation includes an identifier of the relation; and a sixth data structure, stored in the memory, for storing definitions of relations between objects where each objects relation associates a relation, from the fifth data structure, to two objects from the third data structure.

In other embodiments, computer implemented methods for storing ad hoc relations between previously unrelated database objects assigned to database structures in a database using an electronic computing device are presented, the methods including: causing the electronic computing device to provide at least three database structures in the database defined at least as a structure A, a structure B, and a structure C, where each of the at least three database structures each includes a number of objects, where there exists a first number of relations between objects of structure A and objects of structure B, and where there exists a second number of relations between objects of structure B and objects of structure C; filtering data of structure A; accessing structure B by selecting any of the first number of relations between structure A and structure B; storing information about filtering of structure A and information on a first selected path corresponding with the first number of relations between structure A and structure B; filtering results obtained from structure B; accessing structure C by selecting any of the second number of relations between structure B and structure C; storing information about filtering of structure B and information on a second selected path corresponding with the second number of relations between structure B and structure C, where an ad hoc relation between structure A and structure C is created.

In some embodiments, methods are presented further including storing the ad relation. In some embodiments, the information stored is kept in a form of an XML file. In some embodiments, the XML file includes information related to selected structures, selected relations and selected filters. In some embodiments, the steps of filtering, accessing and storing are executed with respect to at least one additional structure related to structure A. In some embodiments, the steps of filtering, accessing and storing are executed with respect to at least one additional structure related to structure B. In some embodiments, the steps of filtering, accessing and storing are executed with respect to at least one additional structure related to structure C. In some embodiments, the at least three database structures are different database structures.

BRIEF DESCRIPTION OF THE DRAWINGS

These and other objects of the invention presented herein are accomplished by providing a computer-implemented method for storing ad hoc relations between previously unrelated database objects assigned to different database structures. Further details and features of embodiments of the present invention, its nature and various advantages will become more apparent from the following detailed description of the preferred embodiments shown in a drawing, in which.

DETAILED DESCRIPTION

The present invention will now be described in detail with reference to a few embodiments thereof as illustrated in the accompanying drawings. In the following description, numerous specific details are set forth in order to provide a thorough understanding of embodiments of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
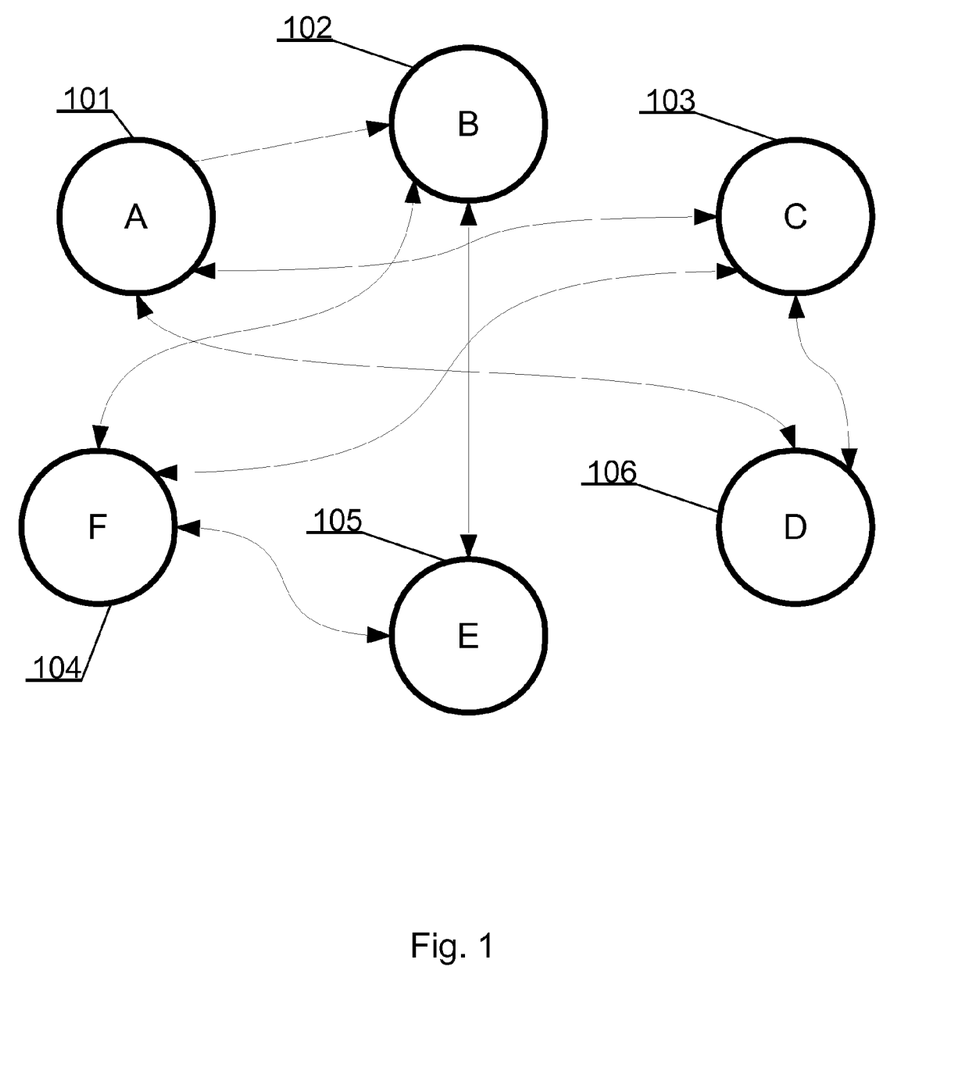
FIG. 1 shows an exemplary database structures diagram.

FIG. 1 shows an exemplary database structures diagram—a mind map, which can be understood in two different ways:

1. Items A 101, B 102, C 103, D 106, E 105, and F 104 are objects;
2. Items A 101, B 102, C 103, D 106, E 105, and F 104 are the objects collections (i.e. a data structure).

Figure 6:
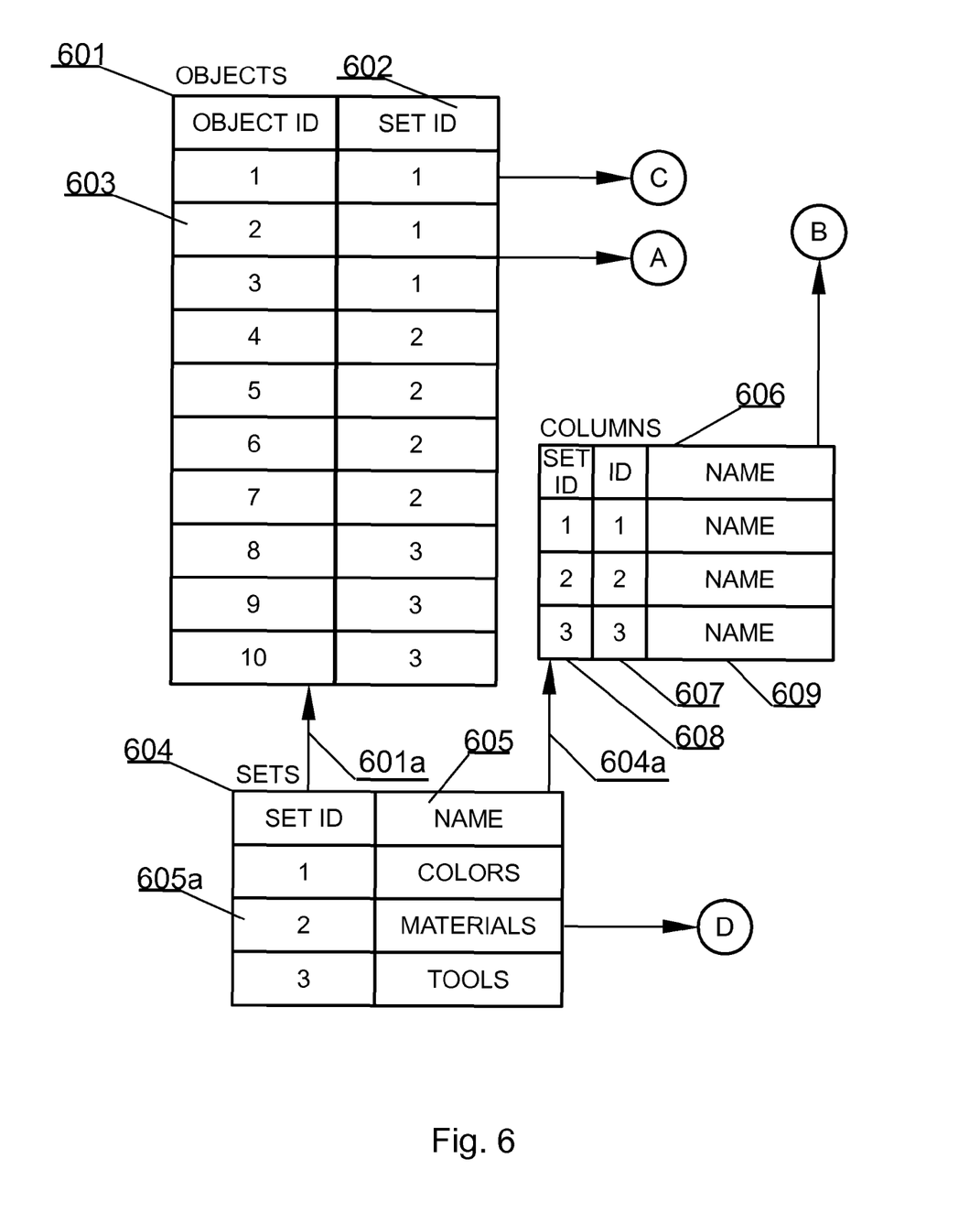
FIGS. 6 and 7 show a mind-map type database system embodying features of the present invention.
Figure 7:
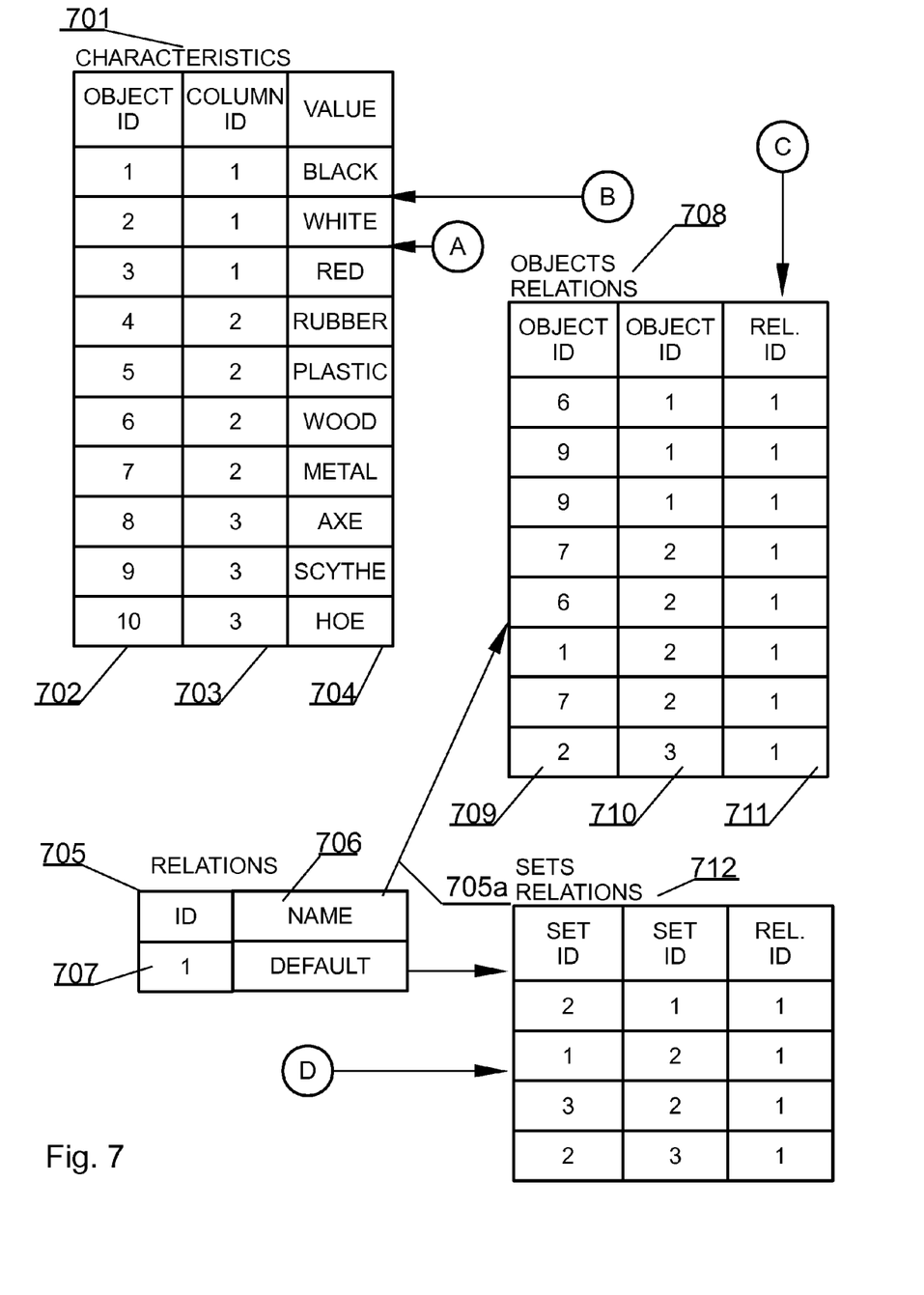

The following example shows an important approach of data processing capabilities in a database, especially in a mind map database technology as shown in FIGS. 6 and 7. Two distant elements can be linked by a transition to the next closest object/structure. FIG. 1 illustrates that the element 'A' 101 is associated with the element 'E' 105, because the element 'A' 101 is in a direct relation with the element 'D' 106, which has a direct relation with element 'C' 103, which has a direct relation with object 'F' 104, which is directly related with object 'E' 105: A→D→C→F→E.

In an automatic analysis, occurrence of the above relationship may be statistically insignificant due to the distance between two objects. However, from the point of view of database data drilling and knowledge extraction, this information may allow the ability to draw appropriate conclusions or to discover a significant piece of information.

For the purpose of this patent application, the following assumption was made—information is sets of data stored in an RDBMS and an RDBMS is the element of data processing.

Knowledge is a collection of such data that the human mind understands, allowing a person to draw appropriate conclusions and make decisions. In order to make the correct decisions a significant amount of data is required so that a decision may be based on knowledge rather than random or partially related pieces of information.

In the current IT era, the amount of publically available data is increasing tremendously over the years. The increasing costs of maintaining such significant volumes of data led to the need for a new data management technology, low-calorie data sets, hereinafter referred to as Big Data. The processing of such information requires the use of statistical analysis and distributed processing. For this purpose mainly Apache HADOOP™ is used as a data storage technology. The most famous example of Big Data usage is an Internet search engine provided by GOOGLE™ Co. Google's search engine statistical information processing methodology does not allow finding an answer based on the connections to results previously obtained, and thus the knowledge extraction from provided information, unless a human mind-mapping capabilities are added.

One of the main examples of this kind of issue would be the attempt to find information in a compound system that has a multi-level relationship with a number of related data. For example, identifying the car steering problems that derive from inadequate structure of the car tires.

The result of a search process focused around a phrase 'steering vibration' gives only a one-dimensional set of answers, in which solution to the problem, most of the time, cannot be discovered without connecting the information. Data analysis is then carried out by the mind of the user and may not result directly from the information model or the search algorithm, thus being limited.

Figure 2:
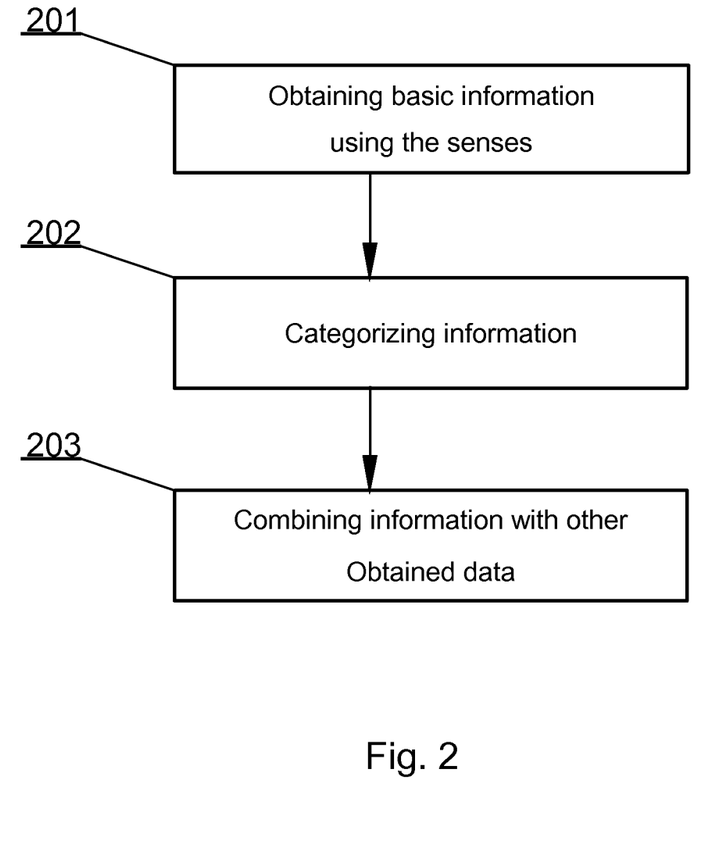
FIG. 2 shows a diagram of processing information by a human brain.

Processing of information by human brain can be basically summarized in the following steps (as shown in FIG. 2). Step 201 is to obtain basic information using the senses (color, odor, sentence, etc.). Next, step 202 is to categorize information, and adding it to the 'shelf' with a similar elements (all green, all predators etc.). Further, step 203 is to combine information with other 'shelves', and/or other objects.

Figure 3:
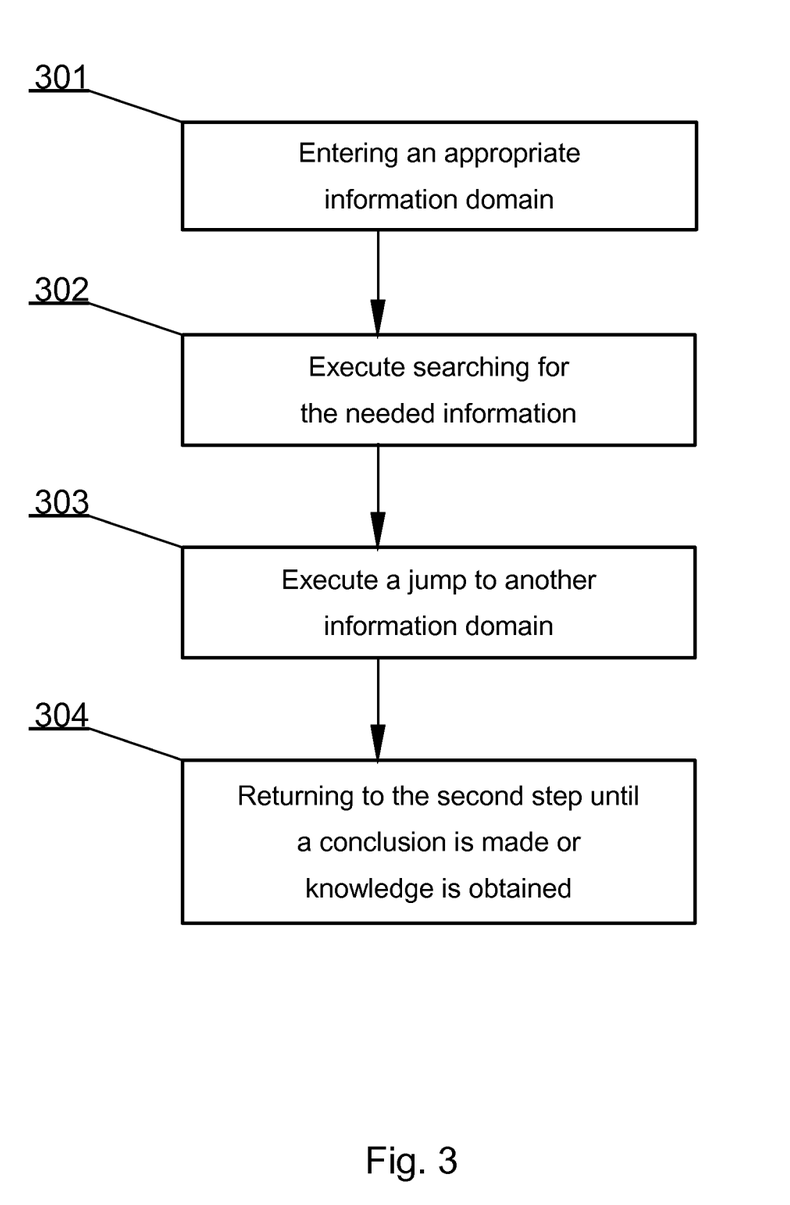
FIG. 3 shows a process of obtaining knowledge.

In the same manner mind maps are constructed. The process of obtaining knowledge can be summarized as shown in FIG. 3. The first step 301 is to enter an appropriate 'shelf' i.e. information domain. Next, at step 302 there is executed searching for the needed information in the 'shelf.' Further, at step 303 there is executed jumping to another 'shelf' using filtered information and certain connection types. Finally, at step 304 one may return to the second step (302) until a conclusion is made or knowledge is obtained.

An example of such a query could be a process of finding a tiger.

1. Entrance into big teeth 'shelf';
2. Jumping through connection to wild animals;
3. Filtering the big cats results;
4. Jumping into the 'shelf' with regions
5. Filtering only the Indian results from the 'shelf';
6. Obtaining a result—for instance tiger.

The example is admittedly exaggerated, and shows that for any information query the human mind can come out with result. The most important suggestion is that using this approach requires the minimum amount of query parameters needed to find appropriate answer from a large dataset.

By using such approach a knowledgeable person may often find results comprising objects that are somehow related only in the mind of this particular person and which often do not appear related to other persons. Hence, in principle, a large database may logically comprise unlimited number of relations, just as in real world.

However, relational databases are not programmed to easily extend hardcoded relations. Programming of relations is not a trivial task and potentially is a source of errors, bottlenecks or deadlocks. Frequently, a process such as addition or edit of a record must trigger numerous other operations on related tables and/or records. Therefore, the end user may not easily create new relations in an end product as this requires in depth knowledge of the particular database system design and database programming knowledge.

An aim of embodiments of the present invention is to allow storing ad hoc relations between previously unrelated database objects assigned to different database structures, which may be very beneficial for knowledge extraction.

Figure 4:
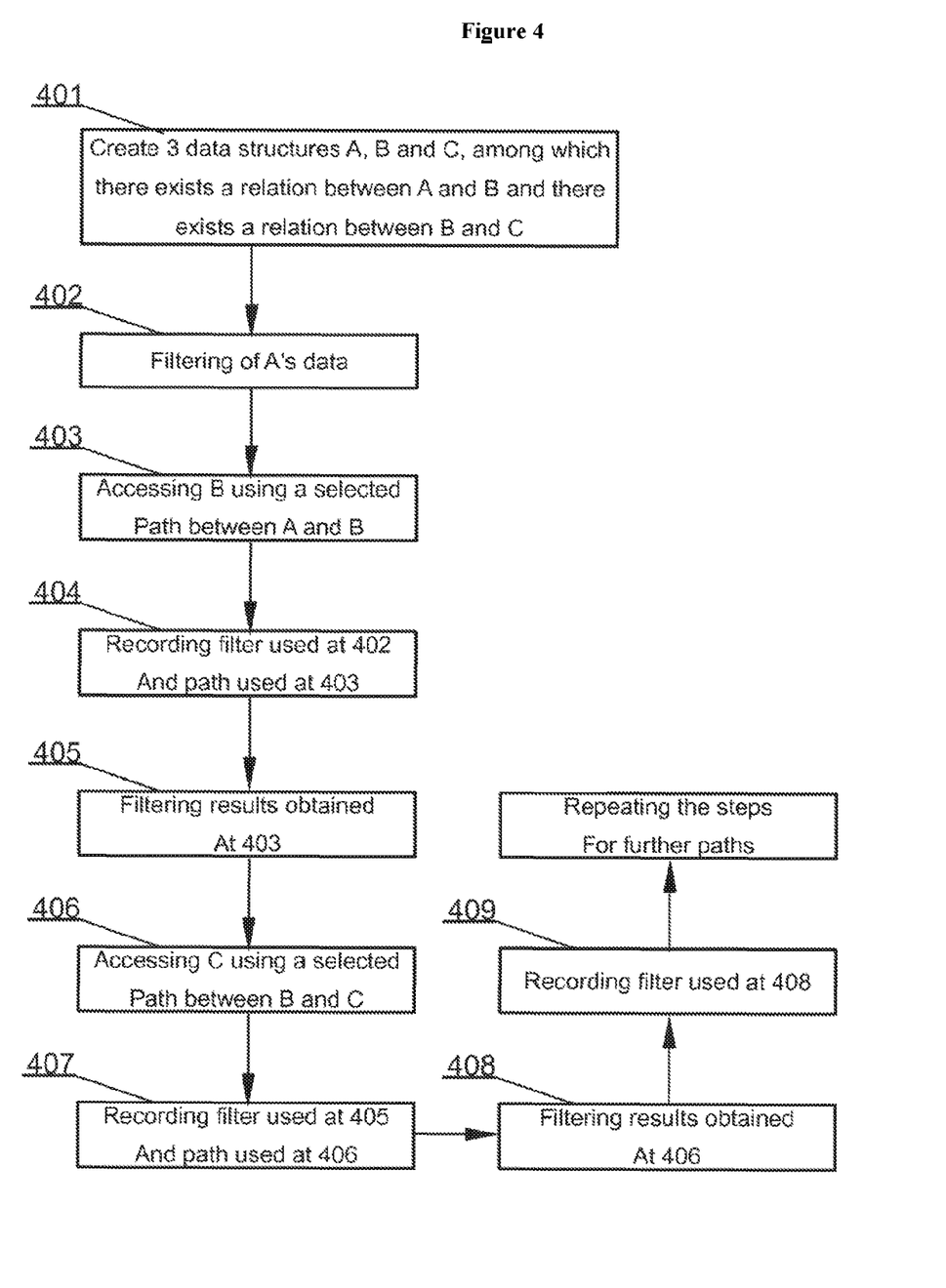
FIG. 4 presents a method for storing ad-hoc relations embodying features of the present invention.

FIG. 4 presents a method for storing ad-hoc relations. The process is designed for databases where there exist at least three database structures A, B and C and where there exists a relation between objects of A and objects of B and where there exists a relation between objects of B and objects of C. There may of course exist many relations between A and B a user may choose from. Similar assumption applies to B-C relation. The above structure is assumed to have been created in a step 401.

Next, at a step 402, a filtering of data is executed on the A structure, for example employees are filtered according to their name. Further, at a step 403, structure B is accessed using a selected path (relation), between structure A and structure B. Frequently there will be more that one path to choose from. After that, at a step 404, information about filtering (step 402) of the first data structure (A) and information on selected path (step 403) between A and B is stored (or recorded).

At this stage, results obtained from data structure B may be filtered at a step 405 and at a step 406 data structure C may be accessed using a selected path/relation, between structure B and structure C. Similarly to step 404, at a step 407 information about filtering (step 405) of the second data structure (B) and information on selected path (step 406) between B and C is stored (or recorded).

Optionally, results obtained from data structure C may be further filtered at step 408. Such filter may be stored (or recorded) at a step 409 in case step 408 has been executed.

Another option that may be executed in a similar manner steps of filtering and moving between data structures, is to apply steps 406, 407 to a further data structure, for example D, related to structure C at a step 409.

Figure 5:
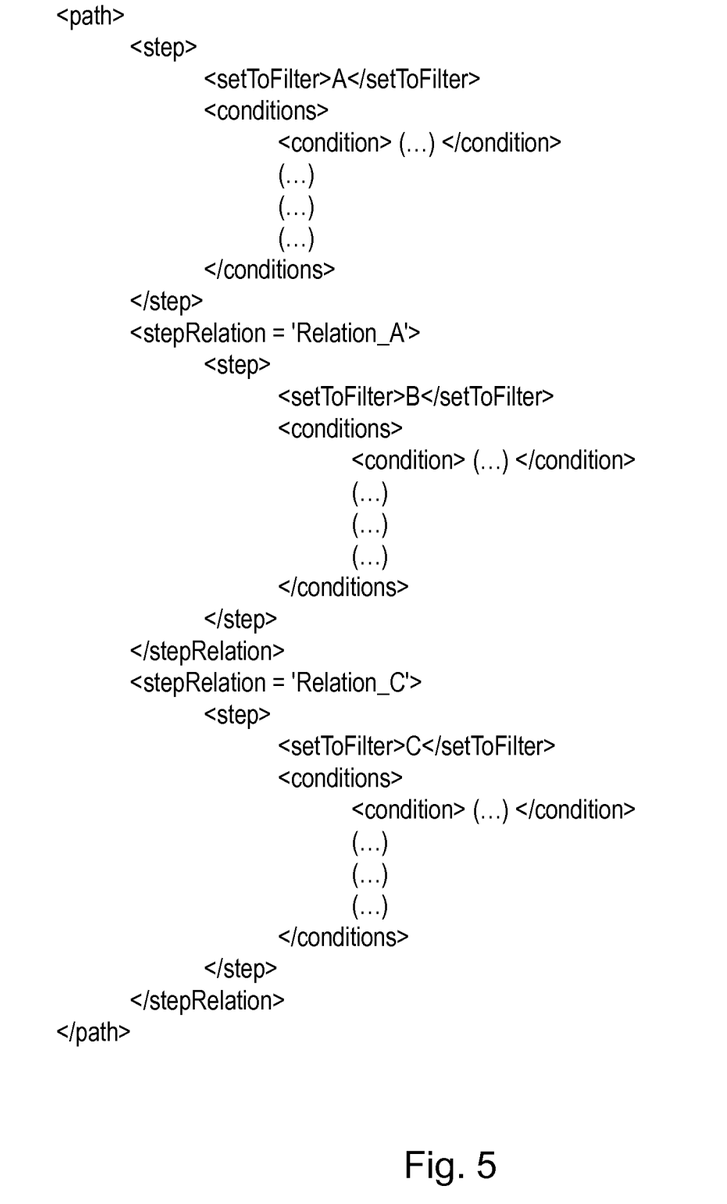
FIG. 5 shows an exemplary implementation of the method shown in FIG. 4 embodying features of the present invention.

FIG. 5 shows an exemplary result of the method shown in FIG. 4. The result is a definition of a path defining the identified multi-table logical relation called herein a path. This result is embodied in an XML (Extensible Markup Language) file. The file defines several level of hierarchy in order to define a path comprising identification of a set (setToFilter), conditions of filtering of a particular set (conditions). Further the file defines a relation (stepRelation) selected to connect two chosen sets. As may be appreciated, there is not any limit with respect to the number of tables (sets) to be used in a cross-querying path. Hence such definitions are very powerful for database designers and users who wish to create complex, ad-hoc logical relations between different data sets.

The system presented herein is especially useful in databases based on mind maps such as a database disclosed in the co-pending European Patent Application number EP13461516.0 (U.S. patent application Ser. No. 14/222,795) by the same Applicant, which is hereby incorporated in its entirety by reference. In that particular database type it is especially easy to execute a process of finding objects of interest that are related to different data structures because, a relation between objects is present in the OBJECT RELATIONS data structure.

The following section of the specification presents portion of the Applicant's co-pending European Patent Application number EP13461516.0 (U.S. patent application Ser. No. 14/222,795).

FIG. 6, corresponding to FIG. 2 of the co-pending application, shows a new database system according to the present invention. In order to perfectly cooperate with mind maps the database system according to the invention has been designed differently than known database systems. The database system comprises six core sets of data and optional sets. The core sets comprise SETS, OBJECTS, COLUMNS, CHARACTERISTICS, RELATIONS and OBJECTS RELATIONS. It has to be noted that the names above are exemplary only and the respective core sets are defined rather by their function within the system than their name.

The first set of data is called SETS 604, because it is used to logically hold data related to sets of data. The sets of data may be represented on a mind map as nodes. Each entry in the SETS data structure 604 comprises at least a unique identifier 605a and preferably also its name 605. Referring back to example from FIG. 1 from the co-pending application there are three SETS, namely COLORS having ID of 1, MATERIALS having ID of 2 and TOOLS having ID of 3. The SETS data structure is a top level structure and does not refer to other data structures but other data structures refer to it as identified by respective arrows between the sets of FIG. 6.

Each set of data is, as in the real world, characterized by some properties typically called columns. Hence, the second set of data is called COLUMNS 606. A property, called typically a column, is uniquely identified with an identifier ID 607 and is associated with a set, defined in the SETS data structure 604, by means of an identifier herein called SET ID 608. A column also preferably is associated with a name 609. As indicated by an arrow 604a, the COLUMNS data structure logically, directly references the SETS data structure, because the COLUMNS data structure uses the identifiers of sets. If, for example, each color of the set called COLORS had another property, say RGB value, there could be added an entry comprising the following values: '1', '4', 'RGB'. At this level of the system the types of respective data such as text, integer, binary large object (BLOB) are not considered as their application in the present system is routine work.

Having defined data structures of SETS and COLUMNS there may be defined objects that will form elements of respective SETS and will have properties defined by the COLUMNS data structure. Objects are held in a second data structure or OBJECTS 601 data structure. This data structure holds entries uniquely identified with an identifier ID 603 and associated with a set, defined in the SETS data structure 604, by means of an identifier herein called SET ID 602. As indicated by an arrow 601a, the OBJECTS data structure logically, directly references the SETS data structure, because it uses the identifiers of sets.

A fourth core data structure is a data structure that holds data entries of each property of each object. This data structure has been called CHARACTERISTICS 301 in FIG. 6. This is one difference from all known databases where there are rows of data that comprise entries for all columns of a data table. In the present invention each property of an object is stored as a separate entry, which greatly improves scalability of the system and allows for example adding objects properties in real time.

Referring to FIG. 7, CHARACTERISTICS 701 data structure holds entries uniquely identified with an identifier OBJECT ID 702 and is associated with a property, defined in the COLUMNS data structure 606 (FIG. 6), by means of an identifier herein called COLUMNID 703. Further each entry in the CHARACTERISTICS data structure, comprises a value 704 of the given property of the particular object. As indicated by respective arrows originating from sources A and B, the CHARACTERISTICS data structure 701 logically, directly references the COLUMNS data structure and the OBJECTS data structure, because it uses the identifiers from the respective data structures.

A fifth core data structure, of the databases system according to the present invention, is designed to hold data regarding relations present in the database. This data structure has been called herein RELATIONS 705. This is a structure that may hold an identifier of a relation ID 707 and preferably also holds the textual description of the relation i.e. a NAME 706. As indicated by an arrow 705a, the RELATIONS data structure logically, directly references downwards the OBJECTS RELATIONS data structure, because the OBJECTS RELATIONS use the identifiers of the relations.

A sixth core data structure of embodiments of the present invention is the mentioned OBJECTS RELATIONS data structure 708. This data structure is designed to provide mapping between a relation from the RELATIONS data structure 705 and two objects from the OBJECTS data structure 701. For example the first entry in the OBJECTS RELATIONS data structure 708 defines that the relation having Rel.ID 711 of 1 exists between object having an OBJECTID 710 of 1 and the object having an OBJECTID 709 of 6.

Optionally a seventh data structure exists in the database system of embodiments of the present invention. This data structure holds data regarding relations between the respective data sets and in FIG. 7 is called SETS RELATIONS 712. This data structure is designed to provide mapping between a relation from the RELATIONS data structure 705 and two sets from the SETS data structure 604. For example, the first entry in the SETS RELATIONS data structure 712 defines that the relation having identifier of 1 exists between a set having an identifier of 1 and a set having an identifier of 2. Providing an entry in the SETS RELATION data structure 712 between a set having an identifier of 1 and a set having an identifier of 2 as well as between a set having an identifier of 2 and a set having an identifier of 1, allows for creating a bidirectional relation.

There is also a possibility of self referencing from a given set in embodiments provided herein. For example such case may be present when there is a set of persons and there exists a student—teacher relation between persons assigned to a particular set.

As described, for example a relational database system of a hundred tables will in the present system be stored in the six above-described data structures. Naturally, most of the data will be kept in the OBJECTS and CHARACTERISTICS data structures.

As can be seen in the mind-map-type database, objects are directly related by means of object relations.

Figure 8:
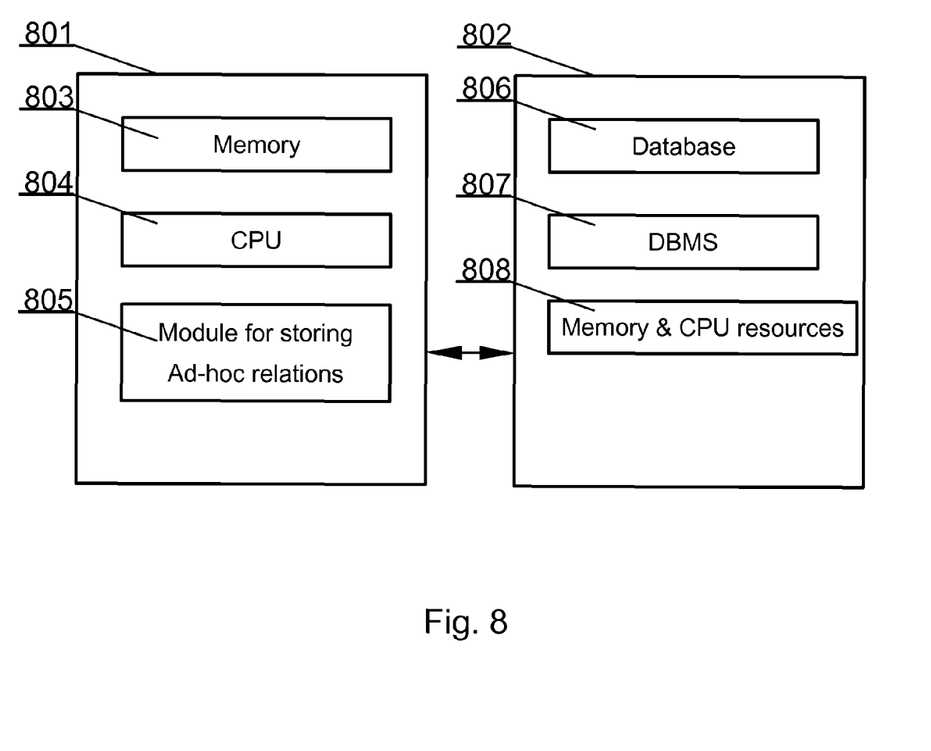
FIG. 8 presents an exemplary database system, for which the present method has been designed and by which it may be implemented embodying features of the present invention.

FIG. 8 presents an exemplary database system embodying features of the present invention, for which the present method has been designed and by which it may be implemented. The database system comprises a client 801 and a server 802. The client 801 accesses the data and is typically a remote terminal from the server 802 that hosts a database 806 and a database management system 807 responsible for responding to client's queries and also having memory and CPU 808. The client is typically a computer comprising a memory 803, a processor 804 and a module 805 for executing methods such as those defined in FIG. 4. It will be evident that a suitable communications channel must be established between the client 801 and the server 802.

It can be easily recognized, by one skilled in the art, that the aforementioned a computer-implemented method for storing ad hoc relations between previously unrelated database objects assigned to different database structures may be performed and/or controlled by one or more computer programs. Such computer programs are typically executed by utilizing the computing resources in a computing device such as personal computers, personal digital assistants, cellular telephones, receivers and decoders of digital television or the like. Applications are stored in non-volatile memory, for example a flash memory or volatile memory, for example RAM and are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

What is claimed is:

1. A computer implemented method for storing ad hoc relations between previously unrelated data objects assigned to different data sets using an electronic computing device, the method comprising:
   (a) creating a database comprising:
      (1) a first data structure comprising definitions of data sets in a relational database, wherein a definition of a data set comprises (i) a unique data set identifier and (ii) a set name, wherein data objects of a first data set comprise at least one relation to data objects of a second data set, and wherein data objects of the second data set comprise at least one relation to data objects of a third data set,
      (2) a second data structure comprising definitions of data properties of the data sets in the relational database, wherein a definition of a data property comprises (i) a unique identifier of the data property and (ii) a data set identifier, from the first data structure, the data property being assigned to,
      (3) a third data structure comprising definitions of data objects of the data sets in the relational database, wherein a definition of a data object comprises (i) a unique data object identifier and (ii) a data set identifier, from the first data structure, the data object being assigned to,
      (4) a fourth data structure comprising definitions of data object values of the data sets in the relational database, wherein a definition of a data object value comprises (i) a data object identifier, from the third data structure, and (ii) a data property, from the second data structure, the data object value being assigned to,
      (5) a fifth data structure comprising definitions of relations of the data sets in the relational database, wherein a definition of a relation comprises (i) a unique identifier of the relation and (ii) a name of the relation,
      (6) a sixth data structure comprising definitions of set relations between data sets in the relational database, wherein a definition of a data object relation associates a relation, from the fifth data structure, with two data set identifiers from the third data structure, and (7) a seventh data structure comprising definitions of set relations between data sets in the relational database, wherein a definition of a set relation associates a relation, from the fifth data structure, with two data object identifiers from the first data structure;

(b) filtering, using a first filter, the data objects of the first data set by (i) identifying a set identifier of the first data set in the first data structure and (ii) applying the first filter to the data properties in the second data structure, the data objects in the third data structure, and the data object values in the fourth data structure;

(c) accessing the second data set through a first selected relation between the first data set and the second data set by using the relations in the fifth data structure, the data object relations in the sixth data structure, and the set relations in the seventh data structure; and (d) storing first information, wherein the first information comprises (i) the first filter and (ii) the first selected relation.

2. The method according to claim 1 wherein the first information stored is kept in a form of an XML file.

3. The method according to claim 2 wherein the XML file includes information related to selected data sets, selected relations and selected filters.

4. The method according to claim 1 wherein the filtering, accessing and storing are executed with respect to a fourth data set related to the third data set, wherein data objects of the fourth data set comprises at least one relation to the data objects of the third data set.

5. The method according to claim 1 further comprises:
filtering, using a second filter, results obtained from the second data set in (c) by applying the second filter to the data objects in the third data structure and the data object values in the fourth data structure;
accessing the third data set through a second selected relation between the second data set and the third data set by using the relations in the fifth data structure, the data object relations in the sixth data structure, and the set relations in the seventh data structure; and
storing second information in a memory, wherein the second information comprises (i) the second filter and (ii) the second selected relation.

6. The method according to claim 1, further comprising creating a mind map structure comprising nodes and directed links, wherein each node of the mind map represents a data set of the data sets in the relational database and each directed link of the directed links represents a relation in the fifth data structure.

7. The method according to claim 6, further comprising identifying a data path from a start node and an end node based on the directed links of the mind map structure.

8. The method according to claim 7, wherein the data path represents a relation or a series of relations in the fifth data structure.

9. The method according to claim 8, wherein the data path represents the series of relations in the fifth data structure.

10. The method according to claim 7, wherein the data path represents a relation between a start data set corresponding to the start node and an end data set corresponding to the end node.

11. A non-transitory computer-readable medium comprising machine-executable code that, upon execution by a computer, implements a method for storing ad hoc relations between previously unrelated database objects assigned to different database structures data sets, the method comprising:

(a) creating a database comprising:
(1) a first data structure comprising definitions of data sets in a relational database, wherein a definition of a data set comprises (i) a unique data set identifier and (ii) a set name, wherein data objects of a first data set comprise at least one relation to data objects of a second data set, and wherein data objects of the second data set comprise at least one relation to data objects of a third data set, (2) a second data structure comprising definitions of data properties of the data sets in the relational database, wherein a definition of a data property comprises (i) a unique identifier of the data property and (ii) a data set identifier, from the first data structure, the data property being assigned to, (3) a third data structure comprising definitions of data objects of the data sets in the relational database, wherein a definition of a data object comprises (i) a unique data object identifier and (ii) a data set identifier, from the first data structure, the data object being assigned to, (4) a fourth data structure comprising definitions of data object values of the data sets in the relational database, wherein a definition of a data object value comprises (i) a data object identifier, from the third data structure, and (ii) a data property, from the second data structure, the data object value being assigned to, (5) a fifth data structure comprising definitions of relations of the data sets in the relational database, wherein a definition of a relation comprises (i) a unique identifier of the relation and (ii) a name of the relation, (6) a sixth data structure comprising definitions of set relations between the data sets in the relational database, wherein a definition of a data object relation associates a relation, from the fifth data structure, with two data set identifiers from the third data structure, and (7) a seventh data structure comprising definitions of set relations between the data sets in the relational database, wherein a definition of a set relation associates a relation, from the fifth data structure, with two data object identifiers from the first data structure;

causing the electronic computing device to define at least three database structures: structure A, structure B and structure C, wherein each of the at least three database structures each includes a plurality of objects, wherein there exists at least one relation between objects of structure A and objects of structure B, and wherein there exists at least one relation between objects of structure B and objects of structure C;

(b) filtering, using a first filter, the data objects of structure A the first data set by (i) identifying a set identifier of the first data set in the first data structure and (ii) applying the first filter to the data properties in the second data structure, the data objects in the third data structure, and the data object values in the fourth data structure;

(c) accessing structure B using the second data set through a first selected relation between structure A and structure B the first data set and the second data set by using the relations in the fifth data structure, the data object relations in the sixth data structure, and the set relations in the seventh data structure; and (d) storing first information, wherein the first information comprises (i) the first filter and (ii) the first selected relation about filtering of structure A and information on a first selected path between structure A and structure B.

12. The medium according to claim 11 wherein the first information stored is kept in a form of an XML.

13. The medium according to claim 12 wherein the XML file includes information related to selected data sets, selected relations and selected filters.

14. The medium according to claim 11 wherein the filtering, accessing and storing are executed with respect to a fourth data set related to the third data set, wherein data objects of the fourth data set comprises at least one relation to the data objects of the third data set.

15. The medium according to claim 11 further comprises:
filtering, using a second filter, results obtained from the second data set in (c) by applying the second filter to the data objects in the third data structure and the data object values in the fourth data structure;
accessing the third data set through a second selected relation between the second data set and the third data set by using the relations in the fifth data structure, the data object relations in the sixth data structure, and the set relations in the seventh data structure; and
storing second information in a memory, wherein the second information comprises (i) the second filter and (ii) the second selected relation.

16. The medium according to claim 11, further comprising creating a mind map structure comprising nodes and directed links, wherein each node of the mind map represents a data set of the data sets in the relational database and each directed link of the directed links represents a relation in the fifth data structure.

17. The medium according to claim 16, further comprising identifying a data path from a start node and an end node based on the directed links of the mind map structure.

18. The medium according to claim 17, wherein the data path represents a relation or a series of relations in the fifth data structure.

19. The medium according to claim 18, wherein the data path represents the series of relations in the fifth data structure.

20. The medium according to claim 17, wherein the data path represents a relation between a start data set corresponding to the start node and an end data set corresponding to the end node.

* * * * *

UNITED STATES PATENT AND TRADEMARK OFFICE
CERTIFICATE OF CORRECTION

PATENT NO. : 9,747,312 B2
APPLICATION NO. : 14/469968
DATED : August 29, 2017
INVENTOR(S) : Krystian Piecko It is certified that error appears in the above-identified patent and that said Letters Patent is hereby corrected as shown below:

In the Claims

Claim 1, Column 10, Line 63 should delete "between data" and replace with --between the data--

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*